June 16, 1959

R. M. MINTON ET AL 2,890,847

FISHING ROD HOLDER

Filed March 14, 1955

Robert M. Minton
Arthur H. Hamner
INVENTORS.

BY
Attorneys

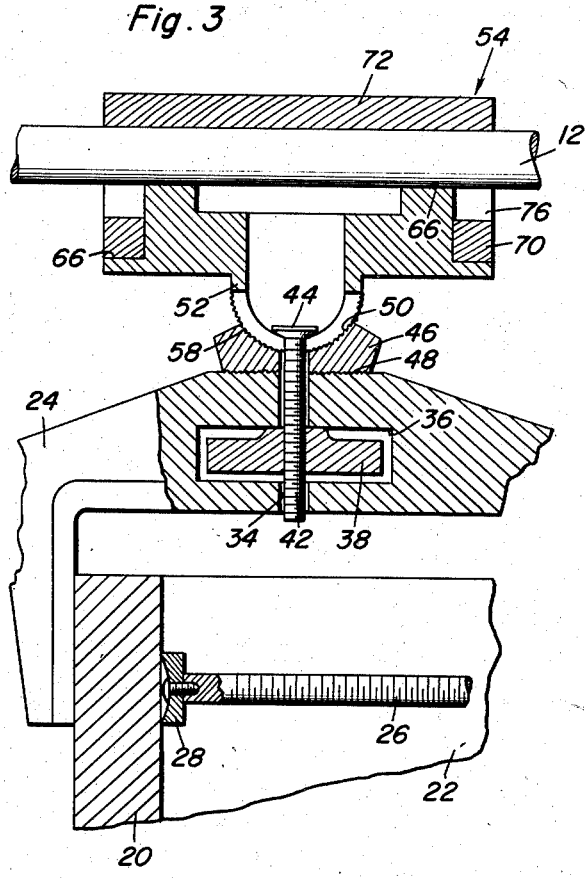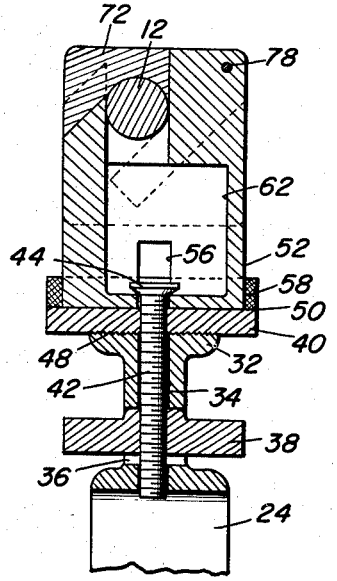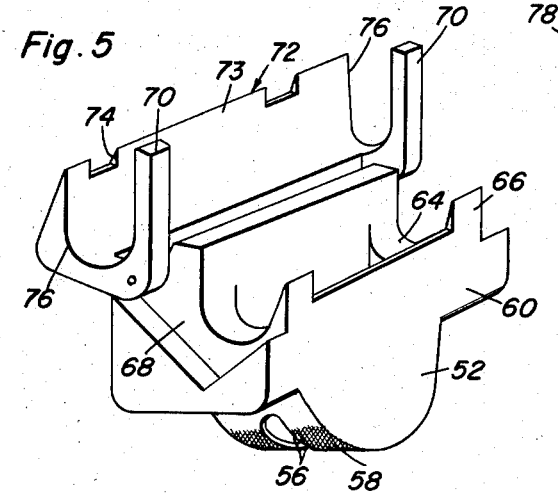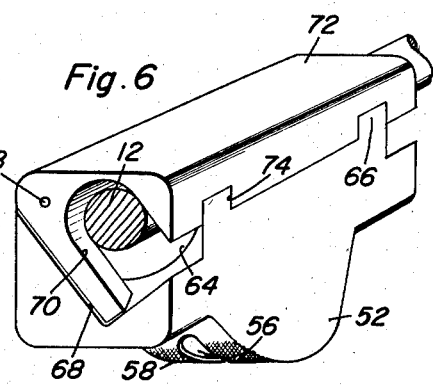

UNITED STATES PATENT OFFICE

2,890,847
FISHING ROD HOLDER

Robert M. Minton, Midland, and Arthur H. Hamner, San Angelo, Tex.

Application March 14, 1955, Serial No. 494,065

1 Claim. (Cl. 248—40)

This invention generally relates to a fishing rod holder, and more specifically provides a novel and improved fishing rod holder adapted to be attached to a boat for retaining the fishing rod in a desired position.

An object of the present invention is to provide a fishing rod holder that may be attached to the gunwale of a boat or any other suitable supporting device for retaining the fishing rod in position and including means for universal adjustment of the fishing rod.

A further object of the present invention is to provide a fishing rod holder conformable to the preceding objects in which the fishing rod is easily and quickly positioned in and removed from the fishing rod clamp, whereupon it is unnecessary to manipulate clamp bolts or other fastening devices for positioning and securing the fishing rod to the fishing rod holder.

Still another important object of the present invention is to provide a fishing rod holder including a novel fishing rod retaining means which will permit easy removal of the fishing rod holder when moved in one direction but will securely retain the fishing rod when the rod is moved in any other manner.

Other important objects of the present invention will reside in its simplicity of construction, ease of adjustment, ease of assembly onto a bolt, ease of positioning and removing a fishing rod in relation thereto, its adaptation for its specific purposes and its relatively inexpensive manufacturing costs.

These together with other objects and advantages which will become subsequently apparent reside in the details of construction and operation as more fully hereinafter described and claimed, reference being had to the accompanying drawings wherein like numerals refer to like parts throughout, and in which:

Figure 3 is a longitudinal, vertical sectional view taken substantially upon a plane passing along section line 3—3 of Figure 2 showing structural details of the fishing rod holder;

Figure 4 is a transverse, vertical sectional view taken substantially upon a plane passing along section line 4—4 of Figure 1 showing further structural details of the fishing rod holder;

Figure 5 is a perspective view showing the rod clamping portion of the fishing rod holder of the present invention; and Figure 6 is a perspective view similar to Figure 5 showing the rod clamping portion in surrounding relation to the rod for removably retaining the fishing rod.

Figures 1, 2:
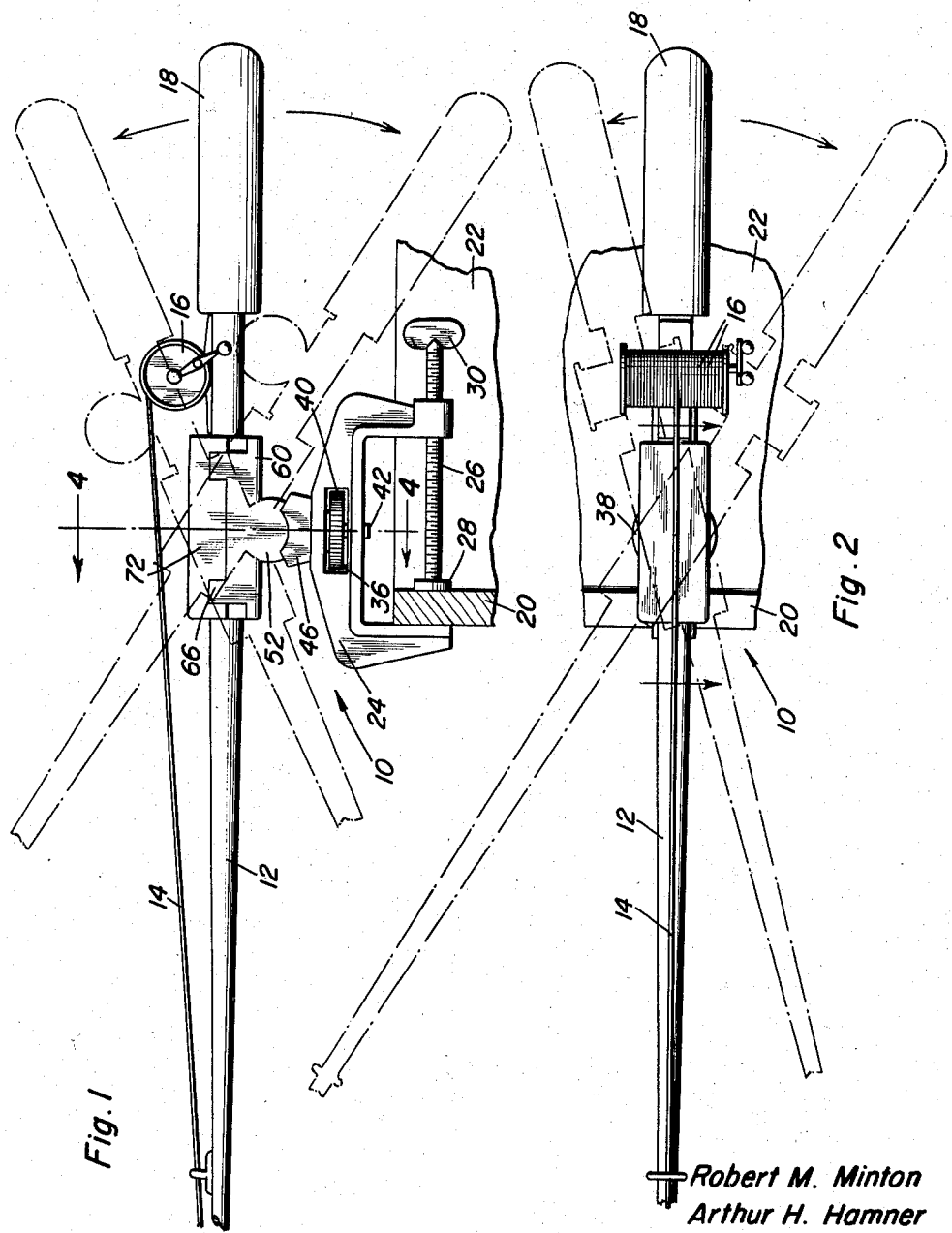
Figure 1 is a side elevational view of the fishing rod holder of the present invention with a fishing rod positioned therein.
Figure 2 is a top plan view of the construction of Figure 1.

Referring now specifically to the drawings, it will be seen that the numeral 10 generally designates the fishing rod holder of the present invention for securing a fishing rod 12 having the usual fishing line 14 thereon and a reel 16 positioned adjacent the rearmost handle 18. The rod holder 10 may be attached to any supporting surface and is illustrated as attached to the gunwale 20 of a boat 22.

The fishing rod holder 10 generally includes an inverted U-shaped member 24 in the nature of a C-clamp having a threaded clamp screw 26 projecting through one arm thereof and including an abutment 28 on the inner end thereof and a finger gripping wing portion 30 at the other end thereof for securely clamping the inverted U-shaped member 24 to the gunwale 20 of the boat 22.

The upper bight portion of the inverted U-shaped clamp member 24 is provided with a transversely extending flattened portion 32 having a vertically extending bore 34 therein which is in communication with an enlarged opening 36 substantially in the center thereof for receiving an enlarged nut 38 having a knurled peripheral surface 40. The bore 34 extends completely through the bight portion of the U-shaped member 24 for receiving the threaded end 42 of a fastening member having a headed portion 44 and which is in screw threaded engagement with the knurled nut 38.

Positioned on the upper surface of the flattened portion 32 of the inverted U-shaped member 24 is an adapter 46 having a flat bottom surface wherein the adapter 46 and the matching surface of the flattened portion 32 are provided with radial serrations 48 whereby the adapter 46 may be adjusted about a vertical axis formed by the screw threaded fastening member 42. The upper edge of the adapter 46 is provided with a concave recess 50 for engaging and receiving a semi-cylindrical projection 52 on the lower end of a fishing rod clamp generally designated by the numeral 54. The semi-cylindrical portion 52 is provided with an arcuate slot 56 for receiving the screw threaded fastening member 42 wherein the headed end 44 engages the inner concave surface of the semi-cylindrical member 52 on each side of the slot 56. The engaging concave recess 50 on the adapter 46 and the lower surface of the semi-cylindrical member 52 are provided with matching serrations 58 whereby the fishing rod clamp 54 may be adjusted in relation to the U-shaped clamp member 24.

The semi-cylindrical member 52 is integrally formed with a generally U-shaped body portion 60 having a central hollow portion 62 and longitudinally spaced U-shaped recesses 64 in the upper surface thereof. A pair of projecting lugs 66 are provided on one edge thereof and provided with tapering edges at their upper ends, and each end of the body portion 60 is provided with a recessed portion 68 for receiving the inner legs 70 of a clamping member or closure member 72. The member 72 is provided with a wall member 73 having notches 74 in the outer edge thereof for receiving the lugs 66 when the wall 73 is disposed in alignment with the wall of the body portion 60 having the lugs 66. The wall of the closure member 72 forms with the legs 70 a U-shaped recess 76 which is aligned with the U-shaped recess 64 in angular relation thereto. The legs 70 are disposed within the recessed portion 68 in engagement with the bottom thereof when the closure member 72 is pivoted about the pivotal connection 78 between the closure member 72 and the body member 60. The fishing rod 12 extends through the fishing rod clamp 54 and is first disposed in the U-shaped recesses 76 when the closure member 72 is pivoted to an open position, after which the closure member 72 is closed to the position illustrated in Figure 6 whereby the fishing rod 12 is then disposed in the U-shaped recesses 64 and 76. Due to the leg 70 engaging the bottom of the recessed portion 68, it will be seen that the U-shaped recess 76 is disposed in angular relation to the U-shaped recess 64 thereby locking the fishing rod 12 therein. By vertical movement of both ends of the fishing rod 12 in relation to the body 60, the closure member 72 will be moved upwardly, thereby permitting the fishing rod 12 to be removed. However, if either end of the fishing rod 12 is moved upwardly without moving the other end thereof upwardly, the fishing rod 12 will be held within the fishing rod clamp 54 due to the particular offset or angular relation of the U-shaped notches or slots 76.

In practical operation, the fishing rod 12 is positioned in the fishing rod clamp 54 by positioning the closure cap 72 in open position, as illustrated in Figure 5, after which the fishing rod 12 may be positioned in the U-shaped notches 76 formed by the wall and legs 70. The closure member 72 is then pivoted about axis 78 to a closed position illustrated in Figure 6, wherein the U-shaped notches 76 are angularly disposed in relation to the U-shaped notches 64 in the body 60, and the legs 70 engage the bottom of the recessed portion 68 wherein the fishing rod 12 will be retained in the fishing rod clamp 54 until such time as both ends of the fishing rod 12 are moved vertically upwardly, which will permit removal of the fishing rod 12. In the event that only one end of the fishing rod 12 is raised or lowered, the fishing rod 12 will be retained in the fishing rod clamp 54 in a secure manner.

By manipulating the knurled nut 38, the position of the fishing rod 12 may be adjusted about a horizontal and a vertical axis, thereby permitting universal adjustment of the fishing rod 12 so that it may be positioned in a desired manner, as illustrated in Figures 1 and 2. While the device is illustrated as being mounted on a boat, it will be understood that the device may be mounted on any suitable support and also may be provided with other types of clamp means particularly adapting the device for a particular purpose.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claim.

What is claimed as new is as follows:

A holder for retaining a fishing rod in a generally horizontally disposed position comprising a body having an elongated base, upstanding side and end walls on said base defining a hollow central area, each of said end walls having an upwardly opening generally U-shaped recess, said recesses being longitudinally aligned, said end walls further having an angularly shaped ledge disposed below said U-shaped recess with the vertex of said angle pointing in the same general direction as the turning point of said U, said vertex and said turning point generally longitudinally aligned, one of said upstanding side walls having a pair of projecting legs provided with tapering edges at their upper ends, a pivotally mounted closure member attached to said body on said second side wall, said closure member having end portions positioned alongside said end walls when the closure member is in closed position, each of said end portions having a generally U-shaped notch, said notches and recesses being disposed in intersecting relation when the closure member is in closed position, said U-shaped notch further having legs which cooperate with said angular ledges when closure member is in closed position, said closure member further having a side wall containing grooved portions of the shape of said projecting legs to cooperate therewith, said notches and recesses receiving a fishing rod therethrough whereby only an equal vertical force along the fishing rod at points adjacent the end walls of said body member will cause the closure member to assume its open position.

References Cited in the file of this patent

UNITED STATES PATENTS

| | | |
|---|---|---|
| D. 136,856 | Olowecki | Dec. 14, 1943 |
| 2,184,583 | Danko | Dec. 26, 1939 |
| 2,516,245 | Nickerson | July 25, 1950 |
| 2,576,212 | Carter | Nov. 27, 1951 |
| 2,626,770 | Norman | Jan. 27, 1953 |
| 2,682,127 | Binder | June 29, 1954 |